(12) United States Patent
VanBlon et al.

(10) Patent No.: US 11,334,113 B2
(45) Date of Patent: May 17, 2022

(54) DISABLING TOUCH INPUT TO INFORMATION HANDLING DEVICE

(71) Applicant: Lenovo (Singapore) Pte. Ltd., Singapore (SG)

(72) Inventors: Russell Speight VanBlon, Raleigh, NC (US); Arnold S. Weksler, Raleigh, NC (US); John Carl Mese, Cary, NC (US); Nathan J. Peterson, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 516 days.

(21) Appl. No.: 13/897,656

(22) Filed: May 20, 2013

(65) Prior Publication Data
US 2014/0340320 A1 Nov. 20, 2014

(51) Int. Cl.
*G06F 3/041* (2006.01)
*G06F 1/16* (2006.01)

(52) U.S. Cl.
CPC .......... *G06F 1/1626* (2013.01); *G06F 1/1694* (2013.01); *G06F 3/0416* (2013.01); *G06F 2200/1637* (2013.01)

(58) Field of Classification Search
CPC .... G06F 3/038; G06F 3/0418; G06F 3/04883; G06F 3/041; H04M 1/72519
USPC ............... 178/18.03; 345/161, 173; 455/566; 463/9
See application file for complete search history.

(56) References Cited

U.S. PATENT DOCUMENTS

| | | | |
|---|---|---|---|
| 2009/0153490 A1* | 6/2009 | Nymark | H04M 1/72519 345/169 |
| 2009/0174679 A1* | 7/2009 | Westerman | 345/173 |
| 2011/0012840 A1* | 1/2011 | Hotelling et al. | 345/173 |
| 2012/0154294 A1* | 6/2012 | Hinckley et al. | 345/173 |
| 2012/0206330 A1 | 8/2012 | Cao et al. | |
| 2012/0262407 A1* | 10/2012 | Hinckley et al. | 345/173 |
| 2013/0207905 A1* | 8/2013 | Hankins | G06F 3/041 345/173 |
| 2014/0092024 A1* | 4/2014 | Ananthapadmanabh | G06F 3/0488 345/173 |

FOREIGN PATENT DOCUMENTS

EP 2248331 A1 11/2010
WO 2012083277 A3 6/2012

* cited by examiner

*Primary Examiner* — Sepehr Azari
(74) *Attorney, Agent, or Firm* — Ference & Associates LLC

(57) ABSTRACT

An aspect provides a method, including: receiving a first input from a device component indicating positional orientation of an information handling device; receiving a second input from a device component indicating that the information handling device is undergoing movement; and disabling, responsive to the first input and the second input, at least a portion of a touch input surface of the information handling device. Other aspects are described and claimed.

20 Claims, 4 Drawing Sheets

DISABLING TOUCH INPUT TO INFORMATION HANDLING DEVICE

BACKGROUND

Information handling devices ("devices") come in a variety of forms, for example laptop computing devices, tablet computing devices, smart phones, e-readers, MP3 players, and the like. Many such devices are configured for use with a touch input surface as a mode of input. In this description, "touch" or "touch sensitive" (or like variations) are used to describe both physical contact sensing and proximity sensing, e.g., "hovering" at or near the surface detecting the input.

Certain form factors, e.g., tablets and smart phones, have large areas capable of accepting touch input. This is advantageous in that a large area (e.g., essentially the entire front surface) may be used to provide touch input to the device. However, having large area(s) capable of detecting touch input has certain disadvantages in several contexts.

BRIEF SUMMARY

In summary, one aspect provides a method, comprising: receiving a first input from a device component indicating positional orientation of an information handling device; receiving a second input from a device component indicating that the information handling device is undergoing movement; and disabling, responsive to the first input and the second input, at least a portion of a touch input surface of the information handling device.

Another aspect provides an information handling device, comprising: one or more processors; a memory device storing instructions accessible to the one or more processors, the instructions being executable by the one or more processors to: receive a first input from a device component indicating positional orientation of the information handling device; receive a second input from a device component indicating that the information handling device is undergoing movement; and disable, responsive to the first input and the second input, at least a portion of a touch input surface of the information handling device.

A further aspect provides a computer program product, comprising: a storage medium having computer readable program code embodied therewith, the computer readable program code comprising: computer readable program code configured to receive a first input from a device component indicating positional orientation of an information handling device; computer readable program code configured to receive a second input from a device component indicating that the information handling device is undergoing movement; and computer readable program code configured to disable, responsive to the first input and the second input, at least a portion of a touch input surface of the information handling device.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

The illustrated example embodiments will be best understood by reference to the figures. The following description is intended only by way of example, and simply illustrates certain example embodiments.

Figure 1:
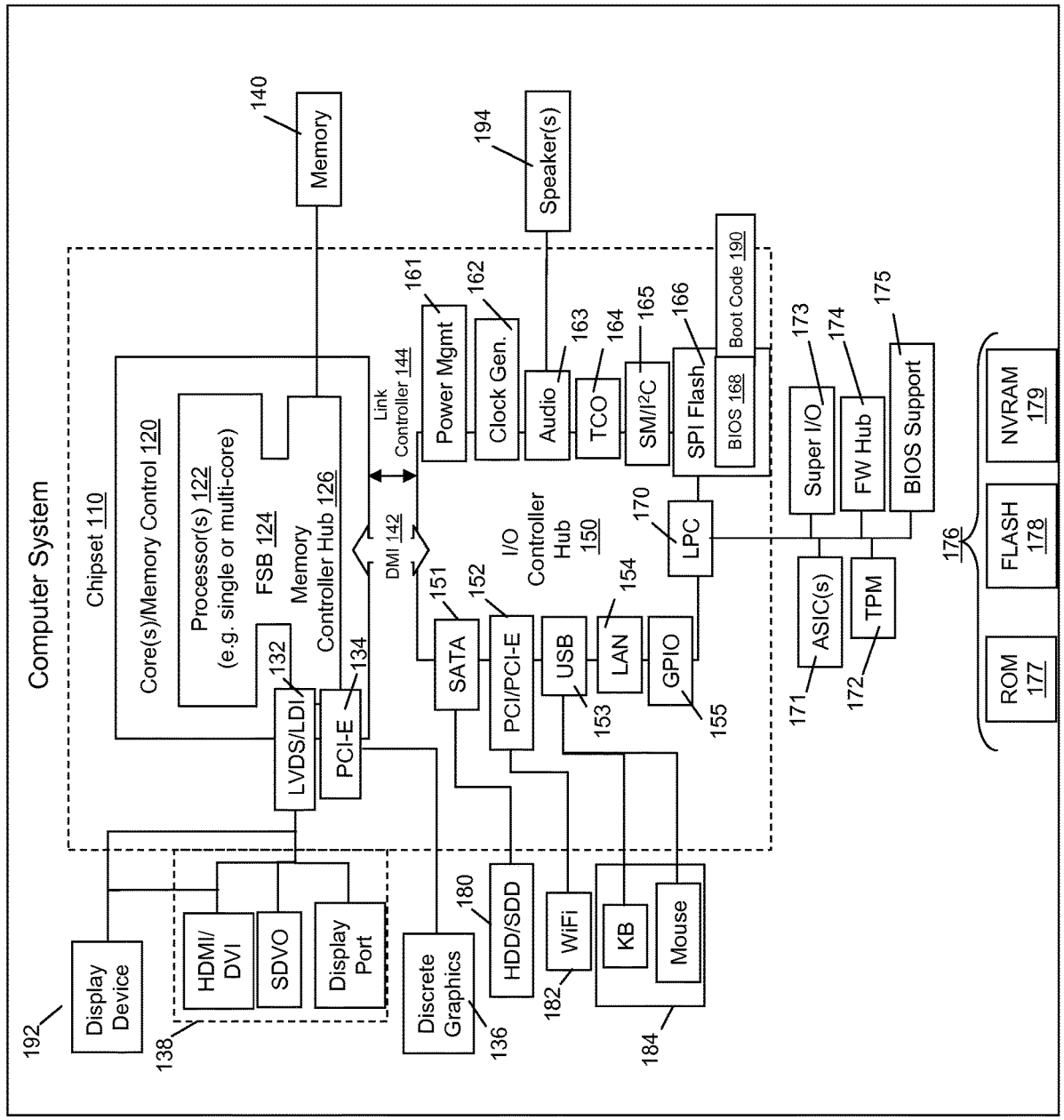
FIG. 1 illustrates an example of information handling device circuitry.
Figure 2:
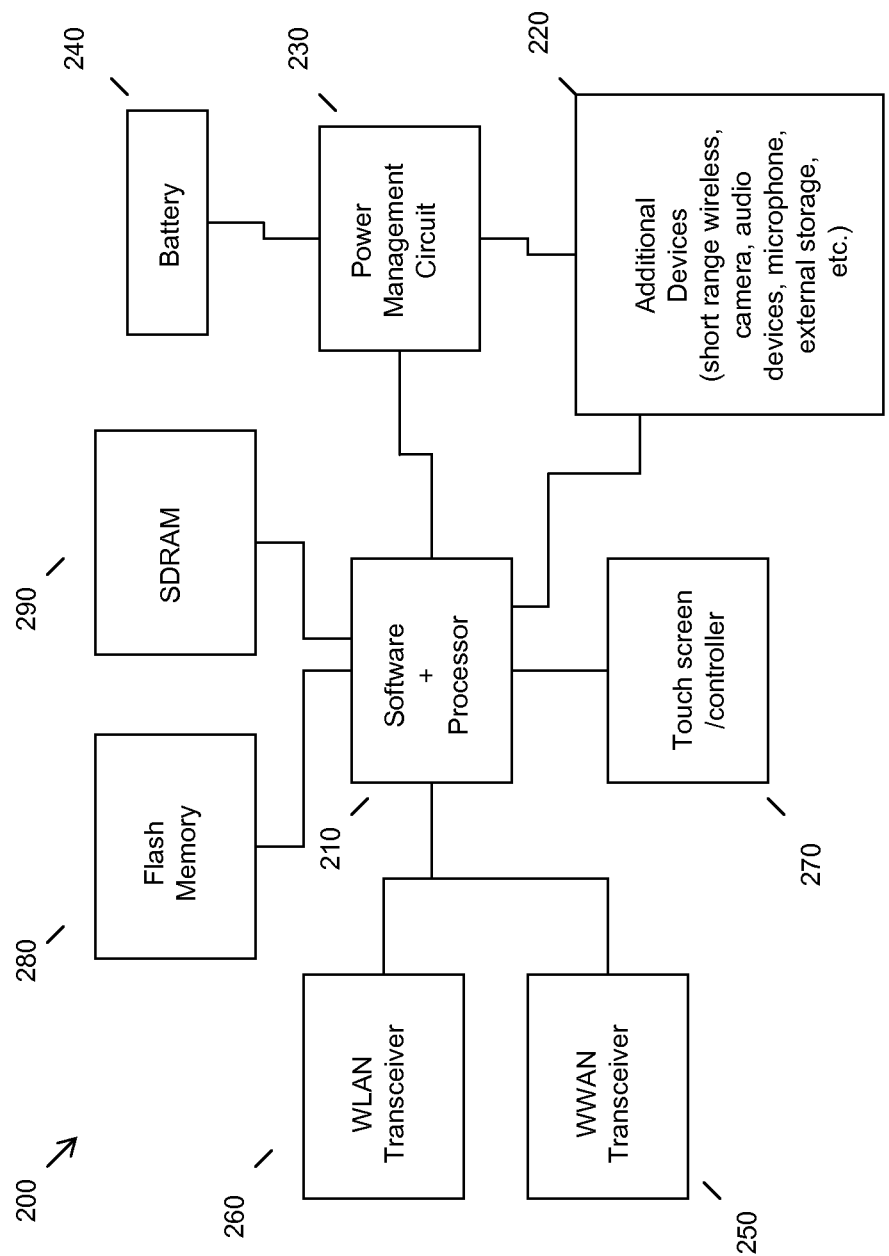
FIG. 2 illustrates another example of information handling device circuitry.

Referring to FIG. 1 and FIG. 2, while various other circuits, circuitry or components may be utilized in information handling devices, with regard to smart phone and/or tablet circuitry 200, an example illustrated in FIG. 2 includes an ARM based system (system on a chip) design, with software and processor(s) combined in a single chip 210. Internal busses and the like depend on different vendors, but essentially all the peripheral devices (220) may attach to a single chip 210. In contrast to the circuitry illustrated in FIG. 1, the tablet circuitry 200 combines the processor, memory control, and I/O controller hub all into a single chip 210. Also, ARM based systems 200 do not typically use SATA or PCI or LPC. Common interfaces for example include SDIO and I2C.

There are power management chip(s) 230, e.g., a battery management unit, BMU, which manage power as supplied for example via a rechargeable battery 240, which may be recharged by a connection to a power source (not shown). In at least one design, a single chip, such as 210, is used to supply BIOS like functionality and DRAM memory.

ARM based systems 200 typically include one or more of a WWAN transceiver 250 and a WLAN transceiver 260 for connecting to various networks, such as telecommunications networks and wireless base stations. Commonly, an ARM based system 200 will include a touch screen 270 for data input and display. ARM based systems 200 also typically include various memory devices, for example flash memory 280 and SDRAM 290.

FIG. 1, for its part, depicts a block diagram of another example of information handling device circuits, circuitry or components. The example depicted in FIG. 1 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 1.

The example of FIG. 1 includes a so-called chipset 110 (a group of integrated circuits, or chips, that work together, chipsets) with an architecture that may vary depending on manufacturer (for example, INTEL, AMD, ARM, etc.). The architecture of the chipset 110 includes a core and memory control group 120 and an I/O controller hub 150 that exchanges information (for example, data, signals, commands, et cetera) via a direct management interface (DMI) 142 or a link controller 144. In FIG. 1, the DMI 142 is a chip-to-chip interface (sometimes referred to as being a link between a "northbridge" and a "southbridge"). The core and memory control group 120 include one or more processors 122 (for example, single or multi-core) and a memory controller hub 126 that exchange information via a front side bus (FSB) 124; noting that components of the group 120 may be integrated in a chip that supplants the conventional "northbridge" style architecture.

In FIG. 1, the memory controller hub 126 interfaces with memory 140 (for example, to provide support for a type of RAM that may be referred to as "system memory" or "memory"). The memory controller hub 126 further includes a LVDS interface 132 for a display device 192 (for example, a CRT, a flat panel, touch screen, et cetera). A block 138 includes some technologies that may be supported via the LVDS interface 132 (for example, serial digital video, HDMI/DVI, display port). The memory controller hub 126 also includes a PCI-express interface (PCI-E) 134 that may support discrete graphics 136.

In FIG. 1, the I/O hub controller 150 includes a SATA interface 151 (for example, for HDDs, SDDs, 180 et cetera), a PCI-E interface 152 (for example, for wireless connections 182), a USB interface 153 (for example, for devices 184 such as a digitizer, keyboard, mice, cameras, phones, microphones, storage, other connected devices, et cetera), a network interface 154 (for example, LAN), a GPIO interface 155, a LPC interface 170 (for ASICs 171, a TPM 172, a super I/O 173, a firmware hub 174, BIOS support 175 as well as various types of memory 176 such as ROM 177, Flash 178, and NVRAM 179), a power management interface 161, a clock generator interface 162, an audio interface 163 (for example, for speakers 194), a TCO interface 164, a system management bus interface 165, and SPI Flash 166, which can include BIOS 168 and boot code 190. The I/O hub controller 150 may include gigabit Ethernet support.

The system, upon power on, may be configured to execute boot code 190 for the BIOS 168, as stored within the SPI Flash 166, and thereafter processes data under the control of one or more operating systems and application software (for example, stored in system memory 140). An operating system may be stored in any of a variety of locations and accessed, for example, according to instructions of the BIOS 168. As described herein, a device may include fewer or more features than shown in the system of FIG. 1.

Information handling devices, as for example outlined in FIG. 1 and FIG. 2, may provide user interfaces that accept touch input (e.g., via a touch pad or touch screen input device). When carrying some devices (e.g., tablets, smartphones, etc.) inadvertent touch input to the touch input surface can occur when carrying the device. To combat this, the user can turn off the touch input device (e.g., touch screen) or put the device into standby mode, but each of these solutions requires user action. The user could also hold the device so that no part of their body touches the touch input surface, but this often times can be difficult while carrying the device. Methods of palm rejection or other input-based filtering exist, but these are imperfect and often not reasonable to use, for example when a user is walking with the device and provides touch input due to slight movements of the hand on the screen. This common occurrence causes inadvertent touch input to register while carrying the device.

Accordingly, an embodiment uses a combination of touch inputs, accelerometer inputs, gyroscope inputs, and/or proximity inputs to determine if touch input should be temporarily disabled. Various example criteria for disabling touch input temporarily are described in connection with various embodiments in more detail with reference to FIG. 3 and FIG. 4.

Figure 3:
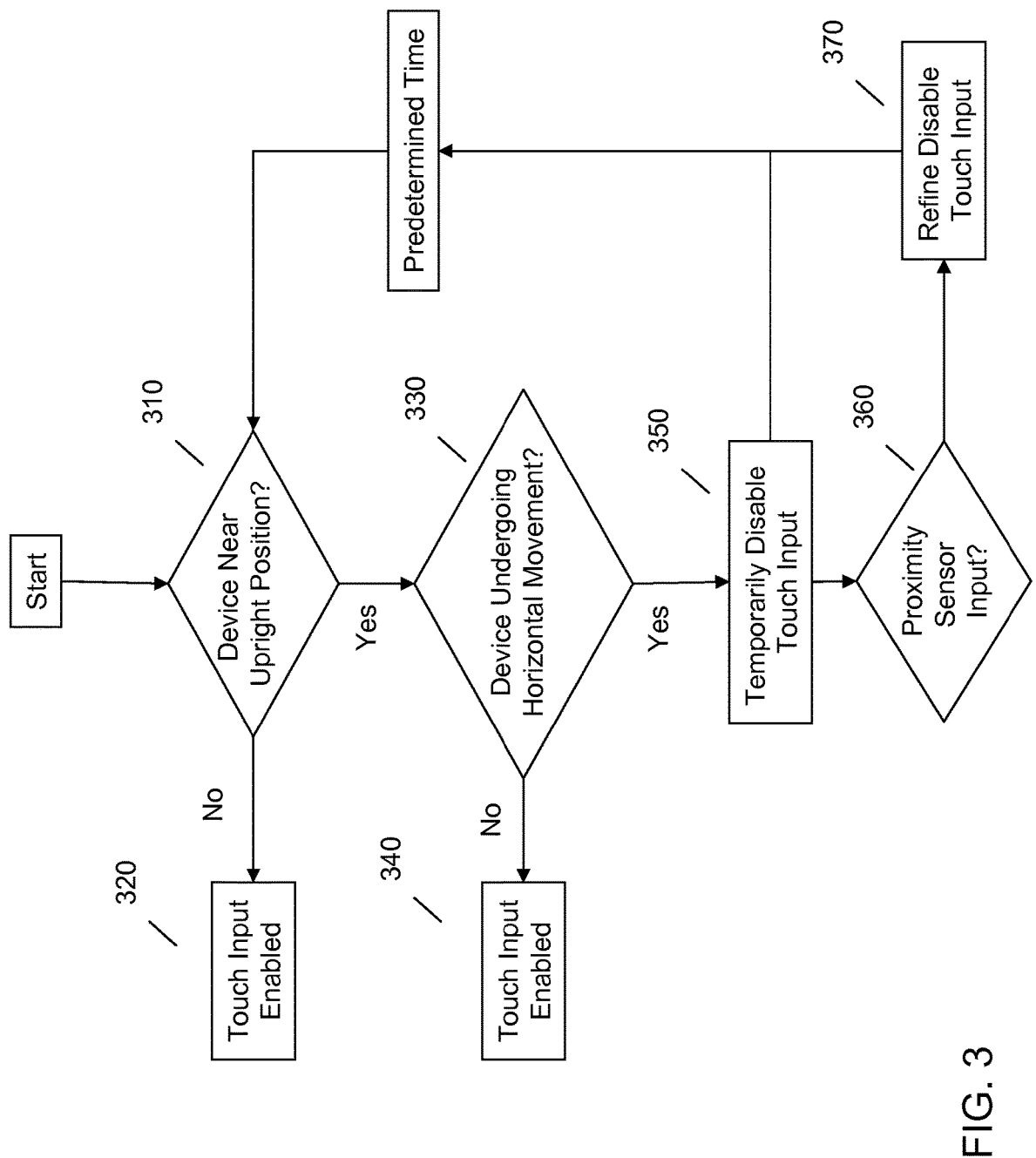
FIG. 3 illustrates an example method of disabling a touch input surface of an information handling device.

In FIG. 3 an example method of temporarily disabling touch input is illustrated. One or more sensors may be utilized to determine if conditions are present that warrant disabling some or all of the touch input surface. It should be noted that the ordering of the steps illustrated in the figures may be modified, as will be apparent to those having ordinary skill in the art.

As an example, an embodiment may detect at 310, e.g., using a gyroscope, if the device is oriented in an upright position (or substantially upright position), e.g., as if being held like a book while the user moves from one area to another. If not, then the device's touch input surface (e.g., touch screen) may remain enabled 320.

If the device is in an upright position at 310, this may be used as an indication that temporarily disabling a touch input surface (or portion thereof) is appropriate. However, a device may be positioned upright (or substantially upright) and yet touch input disablement is not appropriate. Accordingly, an embodiment utilizes more than one input to make an intelligent decision regarding touch input surface disablement.

As illustrated in FIG. 3, another input that may be useful in determining if touch input surface disablement is appropriate includes determining if the device is undergoing movement (as opposed to being stationary or nearly stationary). Accordingly, an embodiment determines if input, e.g., received from an accelerometer, indicates that the device is undergoing movement at 330. The movement may be horizontal, as per the non-limiting example, or other movement indicative of carrying the device, e.g., swinging the device back and forth, or otherwise movement indicative of an inadvertent input condition such as carrying the device where input is not desirable. If not, again the touch input surface may remain enabled 340.

If the device is undergoing horizontal movement, as detected at 330, and the device is oriented substantially upright, as detected at 310, an embodiment may use these received inputs to determine that an event warranting temporary disablement of a touch input surface, or portion thereof, has occurred. Therefore, an embodiment may temporarily disable touch input at 350.

As further illustrated in FIG. 3, the disablement of touch input at 350 may be disablement of the entire touch input surface or portion(s) thereof. For example, an embodiment may intelligently disable certain areas of the touch input surface using one or more of the received inputs from the components mentioned above (e.g., gyroscope and/or accelerometer) and/or from additional components. For example, an embodiment may selectively disable a lower edge (downward facing) of the touch input surface based on the assumption that the device is in fact being carried much like a book, with a user's hand (or finger(s)) wrapped around a lower edge of the device.

Additionally or in the alternative, an embodiment may use additional input(s), for example from a proximity sensor or sensors, to refine the area of touch input surface disablement. For example, at 360 an embodiment may detect if a proximity sensor detects an object, e.g., a user's arm, close to a portion of the device (e.g., the touch input surface or another surface, such as a back side of the device or the front side of the device). If the proximity sensor(s) detect an object at 360, this may be used to refine the area or areas of the touch input surface to be disabled at 370. Therefore, an embodiment may refine (or initially choose) an area or areas for temporary disablement based on the input of one or more components such as a proximity sensor. In this way, embodiments can intelligently target disablement of the touch input surface by mapping or pre-associating certain inputs, e.g., proximity sensor detection of a user's arm or hand proximate to or in contact with a particular area of the device, to certain areas for disablement.

Figure 4:
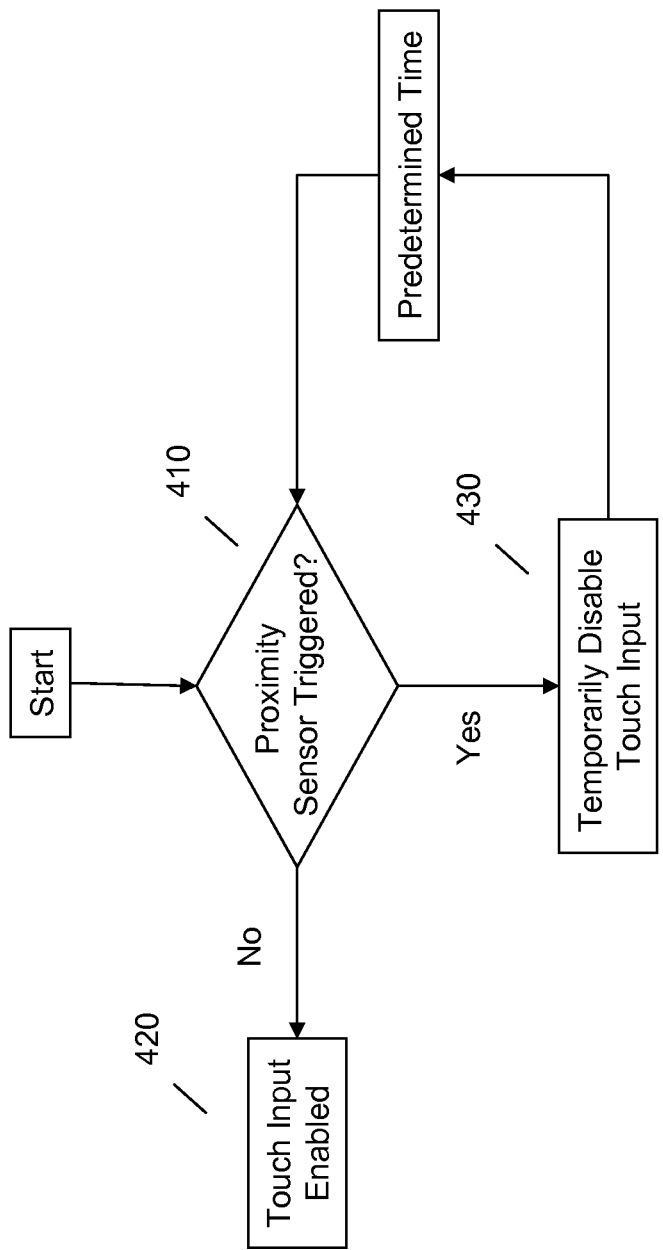
FIG. 4 illustrates another example method of disabling a touch input surface of an information handling device.

Referring to FIG. 4, as an alternative, proximity sensor inputs may be mapped or pre-associated with inadvertent input scenarios (e.g., user carrying the device upright at their side like a magazine or a book) such that sensor input(s) may be used to trigger disablement of appropriate portions of (or the entirety of) the touch input's surface. Therefore, an embodiment may detect that one or more proximity sensors (in appropriately pre-associated area(s)) have been triggered at 410. If so, these input(s) may be used to temporarily disable touch input at 430. Again, if the appropriate inputs are not detected, the touch device may remain enabled at 420. It should be noted that proximity sensors may include sensors that detect actual, physical touch and/or sensors that detect hovering (not physical touching), e.g., as by way of optical sensing.

In terms of disabling the touch input surface (or portions thereof), the disablement may be temporary, e.g., for a predetermined time, such as indicated in FIG. 3 and FIG. 4. Alternatively, the disablement may be temporary in the sense that some user input or confirmation may be required, e.g., manually providing input to a button or pop-up window confirming the action (e.g., continue disablement, remove disablement, etc.). Moreover, disablement may be achieved in a variety of ways, for example disregarding continued inputs form an otherwise active touch input surface (or area thereof), or actual powering off of the touch input surface altogether.

Any combination of one or more non-signal device readable medium(s) may be utilized. The non-signal medium may be a storage medium. A storage medium may be any non-signal medium, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), a personal area network (PAN), or the connection may be made through other devices (for example, through the Internet using an Internet Service Provider) or through a hard wire connection, such as over a USB connection.

Aspects are described herein with reference to the figures, which illustrate example methods, devices and program products according to various example embodiments. It will be understood that the actions and functionality illustrated may be implemented at least in part by program instructions. These program instructions may be provided to a processor of a general purpose information handling device, a special purpose information handling device, or other programmable data processing device or information handling device to produce a machine, such that the instructions, which execute via a processor of the device implement the functions/acts specified.

The program instructions may also be stored in a device readable medium that can direct a device to function in a particular manner, such that the instructions stored in the device readable medium produce an article of manufacture including instructions which implement the function/act specified.

The program instructions may also be loaded onto a device to cause a series of operational steps to be performed on the device to produce a device implemented process such that the instructions which execute on the device provide processes for implementing the functions/acts specified.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:
1. A method, comprising:
receiving a first input from at least one device component indicating an upright positional orientation of an information handling device;

receiving a second input from the at least one device component indicating that the information handling device is undergoing horizontal movement;

determining, based on the first input and the second input, a carrying arrangement of the information handling device;

identifying, based on the determining, a portion of a touch input surface of the information handling device having a high inadvertent touch probability in the carrying arrangement, wherein the portion does not correspond to an entirety of the touch input surface; and disabling, based on the identifying and prior to receiving any touch input on any location of the touch input surface, only the portion of the touch input surface during a duration of the carrying arrangement.

2. The method of claim 1, wherein:
the at least one device component comprises a first and a second device component;
the first component comprises a gyroscope; and
the second component comprises an accelerometer.

3. The method of claim 1, further comprising:
receiving input from a proximity sensor, wherein the input from the proximity sensor comprises input associated with an inadvertent input condition; and
disabling, responsive to the input from the proximity sensor, at least a portion of a touch input surface of the information handling device associated with the proximity sensor input.

4. The method of claim 3, wherein the inadvertent input condition comprises holding the information handling device such that a surface of the information handling device is proximate to an arm of the user.

5. The method of claim 4, wherein the surface of the information handling device is a back surface of the information handling device.

6. The method of claim 4, wherein the surface of the information handling device is a front surface of the information handling device including the touch input surface.

7. The method of claim 1, wherein disabling comprises disabling the entire touch input surface of the information handling device.

8. The method of claim 1, wherein the at least a portion of a touch input surface of the information handling device comprises one or more portions of the touch input surface pre-associated with an inadvertent input condition.

9. The method of claim 8, wherein the one or more portions of the touch input surface pre-associated with an inadvertent input condition comprise an edge of the touch input surface.

10. The method of claim 1, wherein:
said disabling comprises temporarily disabling;
said method further comprising:
determining proximity sensor input indicates user contact with an area of the at least a portion of the touch input surface temporarily disabled; and
refining disablement of the at least a portion of the touch input surface based on the proximity sensor input while the information handling device is upright.

11. An information handling device, comprising:
a sensor;
one or more processors;
a memory device storing instructions accessible to the one or more processors, the instructions being executable by the one or more processors to:
receive a first input from at least one device component indicating an upright positional orientation of the information handling device;

receive a second input from the at least one device component indicating that the information handling device is undergoing horizontal movement;

determine, based on the first input and the second input a carrying arrangement of the information handling device;

identify, based on the determining, a portion of a touch input surface of the information handling device having a high inadvertent touch probability in the carrying arrangement, wherein the portion does not correspond to an entirety of the touch input surface; and disable, based on the identifying and prior to receiving any touch input on any location of the touch input surface, only the portion of the touch input surface during a duration of the carrying arrangement.

12. The information handling device of claim 11, wherein:
the at least one device component comprises a first and a second device component;
the first component comprises a gyroscope; and
the second component comprises an accelerometer.

13. The information handling device of claim 11, further comprising:
a proximity sensor, wherein the instructions further comprise instructions being executable by the one or more processors to:
receive input from the proximity sensor, wherein the input from the proximity sensor comprises input associated with an inadvertent input condition; and
disable, responsive to the input from the proximity sensor, at least a portion of a touch input surface of the information handling device associated with the proximity sensor input.

14. The information handling device of claim 13, wherein the inadvertent input condition comprises holding the information handling device such that a surface of the information handling device is proximate to an arm of the user.

15. The information handling device of claim 14, wherein the surface of the information handling device is a back surface of the information handling device.

16. The information handling device of claim 14, wherein the surface of the information handling device is a front surface of the information handling device including the touch input surface.

17. The information handling device of claim 11, wherein disabling comprises disabling the entire touch input surface of the information handling device.

18. The information handling device of claim 11, wherein the at least a portion of a touch input surface of the information handling device comprises one or more portions of the touch input surface pre-associated with an inadvertent input condition.

19. The information handling device of claim 18, wherein the one or more portions of the touch input surface pre-associated with an inadvertent input condition comprise an edge of the touch input surface.

20. A computer program product, comprising:
a storage device having computer readable program code embodied therewith, the computer readable program code being executable by a processor and comprising:
computer readable program code that receives a first input from at least one device component indicating an upright positional orientation of an information handling device;
computer readable program code that receives a second input from the at least one device component indicating that the information handling device is undergoing horizontal movement;

code that determines, based on the first input and the second input, a carrying arrangement of the information handling device;

computer readable program code that identifies a portion of a touch input surface of the information handling device having a high inadvertent touch probability in the carrying arrangement, wherein the portion does not correspond to an entirety of the touch input surface; and computer readable program code that disables, based on the identifying and prior to receiving any touch input on any location of the touch input surface, only the portion of the touch input surface during a duration of the carrying arrangement.

* * * * *